United States Patent
Schlattmann et al.

(10) Patent No.: US 9,942,450 B2
(45) Date of Patent: Apr. 10, 2018

(54) AUTOMATIC TIME SIGNATURE-BASED VIDEO MATCHING FOR A CAMERA NETWORK

(71) Applicant: AGT International GmbH, Zurich (CH)

(72) Inventors: Markus Schlattmann, Griesheim (DE); Stefan Diener, Muenster (DE)

(73) Assignee: AGT INTERNATIONAL GMBH, Zurich (CH)

( * ) Notice: Subject to any disclaimer, the term of this patent is extended or adjusted under 35 U.S.C. 154(b) by 78 days.

(21) Appl. No.: 14/792,622

(22) Filed: Jul. 7, 2015

(65) Prior Publication Data
US 2016/0014305 A1    Jan. 14, 2016

Related U.S. Application Data

(60) Provisional application No. 62/023,287, filed on Jul. 11, 2014.

(51) Int. Cl.
*H04N 5/44* (2011.01)
*H04N 5/04* (2006.01)
*G06K 9/00* (2006.01)

(52) U.S. Cl.
CPC .......... *H04N 5/04* (2013.01); *G06K 9/00758* (2013.01); *G06K 9/00785* (2013.01); *H04N 5/44* (2013.01)

(58) Field of Classification Search
None
See application file for complete search history.

(56) References Cited

U.S. PATENT DOCUMENTS

| 6,295,367 B1 | 9/2001 | Crabtree et al. |
| 2005/0140783 A1 | 6/2005 | Akamatsu |

(Continued)

FOREIGN PATENT DOCUMENTS

| CN | 101727671 B | 5/2012 |
| DE | 102007001649 | 7/2008 |

(Continued)

OTHER PUBLICATIONS

Amol Borkar et al.: "A Non Overlapping Camera Network: Calibration and Application Towards Lane Departure Warning", Jul. 2011.

(Continued)

*Primary Examiner* — Eileen Adams
(74) *Attorney, Agent, or Firm* — Browdy and Neimark, PLLC

(57) ABSTRACT

A method for automatically matching video streams from two cameras of a camera network includes obtaining a video stream of frames that are acquired by each of the cameras. Each video stream includes images of moving objects. A time signature for each of the video streams is calculated. Each time signature is indicative of a time at which an image of one the objects is located at a predetermined part of the frame. A temporal offset of one of the signatures relative to the other signature is calculated such that, when applied to one of the signatures, a correspondence between the signatures is maximized. The temporal offset is applicable to video streams that are acquired by the two cameras to determine if a moving object that is imaged by one of the cameras is identical to a moving object that is imaged by the other camera.

20 Claims, 4 Drawing Sheets

(56) References Cited

U.S. PATENT DOCUMENTS

| | | | |
|---|---|---|---|
| 2006/0007308 A1 | 1/2006 | Ide et al. | |
| 2006/0282783 A1* | 12/2006 | Covell | H04N 19/86 715/744 |
| 2008/0095360 A1* | 4/2008 | Vuillaume | H04L 9/0863 380/44 |
| 2008/0240616 A1 | 10/2008 | Haering et al. | |
| 2008/0294019 A1* | 11/2008 | Tran | A61B 5/0006 600/301 |
| 2009/0040301 A1 | 2/2009 | Sandler et al. | |
| 2010/0245593 A1 | 9/2010 | Kim et al. | |
| 2012/0002014 A1* | 1/2012 | Walsh | G06T 19/006 348/47 |
| 2013/0120224 A1* | 5/2013 | Cajigas | G09G 5/00 345/8 |
| 2013/0331182 A1* | 12/2013 | Tanzawa | A63F 13/426 463/31 |
| 2013/0336583 A1 | 12/2013 | Ernst et al. | |
| 2014/0036087 A1* | 2/2014 | Furue | G11B 27/034 348/157 |
| 2014/0169633 A1* | 6/2014 | Seyfried | G06K 9/00791 382/105 |

FOREIGN PATENT DOCUMENTS

| | | |
|---|---|---|
| EP | 1744292 A2 | 1/2007 |
| EP | 2309451 A1 | 4/2011 |
| GB | 2395551 | 5/2004 |
| WO | WO 2014/013012 | 1/2014 |
| WO | WO 2014/013015 | 1/2014 |

OTHER PUBLICATIONS

Barron J L et al.: "Systems and Experiment performance of Optical flow technique", International Journal of Computer Vision. Kluwer Academic Publishers, Norwell, US, vol. 12, No. 1, Jan. 1, 1994, pp. 43-77, XP001109171, ISSN: 0920-5691, DOI: 10.1007/BF0140984.

Burt P J et al.: "Object tracking with a moving camera" Visual Motion, 1989, Proceedings. Workshop on Irvine, CA, USA Mar. 20-22, 1989, Washington, DC, USA, IEEE Comput. Soc. PR, XP010014669. DOI: 10.1109/WVN.1989.47088. ISBN: 978-0-8186-1903-8.

Chen et al.: "Wide Area Camera Calibration Using Virtual Calibration Objects", Proceedings of Computer Vision and Pattern Recognition, pp. 520-527, 2000.

Chen and Leung: "Multi-Camera Tracking by Joint Calibration, Association and Fusion", Department of Electrical and Computer Engineering University of Calgary. Calgary, Alberta, Canada, 2011, IEEE.

European Search Report from EP12176857 dated Dec. 18, 2012.
European Search Report from EP2709058 dated Dec. 13, 2012.
Hu W et al.: "A Survey on Visual Surveillance of Object Motion and Behaviors", IEEE Transactions on Systems, MAN and Cybernetics: Part C: Applications and Reviews, IEEE Service Center, Piscataway, NJ, US, vol. 34, No. 3, Aug. 1, 2004, pp. 334-352, XP011114887, ISSN: 1094-6977, DOI: 10.1109/TSMCC.2004.829274.

International Search Report together with Written Opinion from PCT/EP2013/065174 dated Dec. 12, 2013.
International Search Report together with Written Opinion from PCT/EP2013/065183 dated Dec. 9, 2013.
Kanhere and Birchfield: "A Taxonomy and Analysis of Camera Calibration Methods for Traffic Monitoring Applications", Intelligent Transportation Systems, IEEE vol. 11 Issue 2, pp. 441-452, ISSN: 1524-9050, Jun. 2010.

Marta Wilczkowiak et al.: "Camera Calibration and 3D Reconstruction from Single Images Using Parallelepipeds", inria-00525657, version 1—May 26, 2011.

Rahimi et al.: "Simultaneous Calibration and Tracking with a Network of Non-Overlapping Sensors", Proceedings of Computer Vision and Pattern Recognition, pp. 187-194, 2004.

Svoboda et al.: "A Convenient Multi-Camera Self-Calibration for Virtual Environments", Computer Vision Lab Department of Information Technology and Electrical Engineering Swiss Federal Institute of Technology and Centre for Machine Perception Department of Cybernetics, Czech Technical University in Prague. Revised version: Jun. 16, 2004.

Yao-Te Tsai et al.: "Multiple Human Objects Tracking in crowded Scene", 18th International Conference on Pattern Recognition (ICPR '06), vol. 3, Jan. 1, 2006, pp. 51-54, XP055046751, DOI: 10.1109/ICPR.2006.841, ISBN: 978-0-76-952521-1.

Yilmaz Alper et al.: "Object Tracking: A Survey", ACM Computing Surveys, ACM, New York, NY, US, vol. 38, No. 4, Dec. 1, 2006, pp. 1-45, XP007902942. ISSN: 0360-0300.

* cited by examiner

US 9,942,450 B2

AUTOMATIC TIME SIGNATURE-BASED VIDEO MATCHING FOR A CAMERA NETWORK

CROSS REFERENCE TO RELATED APPLICATIONS

The present invention claims the priority benefit of U.S. provisional patent application No. 62/023,287 filed on Jul. 11, 2014, which is incorporated in its entirety herein by reference.

FIELD OF THE INVENTION

The present invention relates to camera networks. More particularly, the present invention relates to automatic video matching for a camera network, the video matching being based on time signatures.

BACKGROUND OF THE INVENTION

Traffic-monitoring cameras arranged along a road may be operated automatically to monitor traffic conditions. A typical traffic camera network includes cameras that are arranged along the length of the road and aimed to acquire video images of the road. Thus, the progress of a vehicle may be tracked as it travels along the road.

For example, automatic monitoring of the progress of individual vehicles as they travel along the road may be helpful in determining traffic conditions on the road. Timely detection of deviations from expected traffic patterns may enable prompt remedial action. For example, a traffic signal that is not operating properly may be reset, lost electrical power may be restored, police may be summoned to direct traffic, or a service vehicle may be summoned to remove a stalled vehicle from traffic.

Calibration may refer to a process of finding intrinsic and extrinsic parameters of a camera, such as a 3×4 camera matrix in the form of a homography. The camera matrix may be used to denote a projective mapping from world coordinates (e.g., x, y, z) to screen coordinates (e.g., u, v). Calibration may be performed for a world coordinate system, C, that is defined relative to the camera. To transform C into a global coordinate system W (e.g., latitude and longitude, or another global or regional coordinate system), an exact global location and orientation of the camera is required together with the obtained parameters of the calibration.

Many urban surveillance systems include a large number (e.g., thousands) of cameras. The cameras were neither calibrated during deployment, nor were their positions and orientations accurately measured. Instead, the cameras may be roughly associated with the name of the street being monitored or with rough Global Positioning System (GPS) estimates. Performance of a standard calibration process for each of the cameras may represent a tedious, expensive, and daunting task.

SUMMARY OF THE INVENTION

There is thus provided, in accordance with an embodiment of the present invention, a method for automatically matching video streams from two cameras of a camera network, the method including: obtaining a video stream of frames that are acquired by each of the cameras, each video stream including images of a plurality of moving objects; calculating a time signature for each of the video streams, each time signature being indicative of a time at which an image of one of the plurality of moving objects is located at a predetermined part of the frame; and calculating a temporal offset of one of the signatures relative to the other signature that, when applied to the one of the signatures, substantially maximizes a correspondence between the one of the signatures and the other signature, the temporal offset being applicable to video streams that are acquired by the two cameras to determine if a moving object that is imaged by one of the cameras is identical to a moving object that is imaged by the other of the cameras.

Furthermore, in accordance with some embodiments of the present invention, the plurality of moving objects moves along a substantially common path.

Furthermore, in accordance with some embodiments of the present invention, the predetermined part is located on an image of the path.

Furthermore, in accordance with some embodiments of the present invention, the path includes a traffic lane.

Furthermore, in accordance with some embodiments of the present invention, the plurality of objects moves along the path with a substantially constant speed.

Furthermore, in accordance with some embodiments of the present invention, the method further includes changing a location of the predetermined part of the frame in accordance with a comparison of the time signatures.

Furthermore, in accordance with some embodiments of the present invention, the predetermined part is defined by a point.

Furthermore, in accordance with some embodiments of the present invention, calculating the time signature includes applying a binary scheme.

Furthermore, in accordance with some embodiments of the present invention, the correspondence is maximized when a correlation of the two signatures is maximized.

Furthermore, in accordance with some embodiments of the present invention, calculating the temporal offset includes applying dynamic time warping to the signatures.

Furthermore, in accordance with some embodiments of the present invention, the method further includes using the temporal offset to calculate a spatial relationship between fields of view of the two cameras.

Furthermore, in accordance with some embodiments of the present invention, calculating the spatial relationship includes calculating a degree of overlap between the fields of view.

Furthermore, in accordance with some embodiments of the present invention, calculating the spatial relationship includes calculating a gap between the fields of view.

Furthermore, in accordance with some embodiments of the present invention, the method further includes using the calculated temporal offset to calculate a de-synchronization of the video streams.

There is further provided, in accordance with some embodiments of the present invention, a non-transitory computer readable storage medium having stored thereon instructions that when executed by a processor will cause the processor to perform the method of: obtaining a video stream that is acquired by each camera of a camera network of a plurality of moving objects; calculating a time signature for each video stream, the time signature being indicative of a time at which an image of one of the plurality of moving objects is located at a predetermined part of a frame of that video stream; and calculating a temporal offset between two of the time signatures, such that when the temporal offset is applied to one of the two time signatures, a correspondence between the two time signatures is maximized; and applying the temporal offset to video streams that are acquired by the cameras that acquired the video streams from which the two of the time signatures were calculated to determine if a moving object that is imaged by one of the cameras is identical to a moving object that is imaged by the other of the cameras.

Furthermore, in accordance with some embodiments of the present invention, the instructions are further executable by the processor to identify within each video stream an image of a path along which the plurality of moving objects moves.

Furthermore, in accordance with some embodiments of the present invention, the instructions are further executable by the processor to cause the processor to perform the method of calculating a spatial relationship between fields of view of the cameras.

There is further provided, in accordance with an embodiment of the present invention, a system including: a network of a plurality of cameras, each camera being configured to acquire a video stream of a plurality of moving objects; and a processing unit in communication with a computer readable medium, wherein the computer readable medium contains a set of instructions wherein the processing unit is designed to carry out the set of instructions to: calculate a time signature for each video stream that is acquired by each of the plurality of cameras, each time signature being indicative of a time at which an image of one of the plurality of moving objects in that video stream is located at a predetermined part of a frame of that video stream; calculate a temporal offset each of the time signatures relative to another of the time signatures such that when the time offset is applied to the each of the time signatures, a correspondence between the each of the time signatures and the another of the time signatures is maximized; and apply the temporal offset to video streams that are acquired by different cameras of the plurality of cameras to determine if a moving object that is imaged by one of the plurality of cameras is identical to a moving object that is imaged by another of the plurality of cameras.

Furthermore, in accordance with some embodiments of the present invention, the plurality of moving objects moves along a substantially common path.

Furthermore, in accordance with some embodiments of the present invention, the plurality of moving objects includes a plurality of vehicles.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
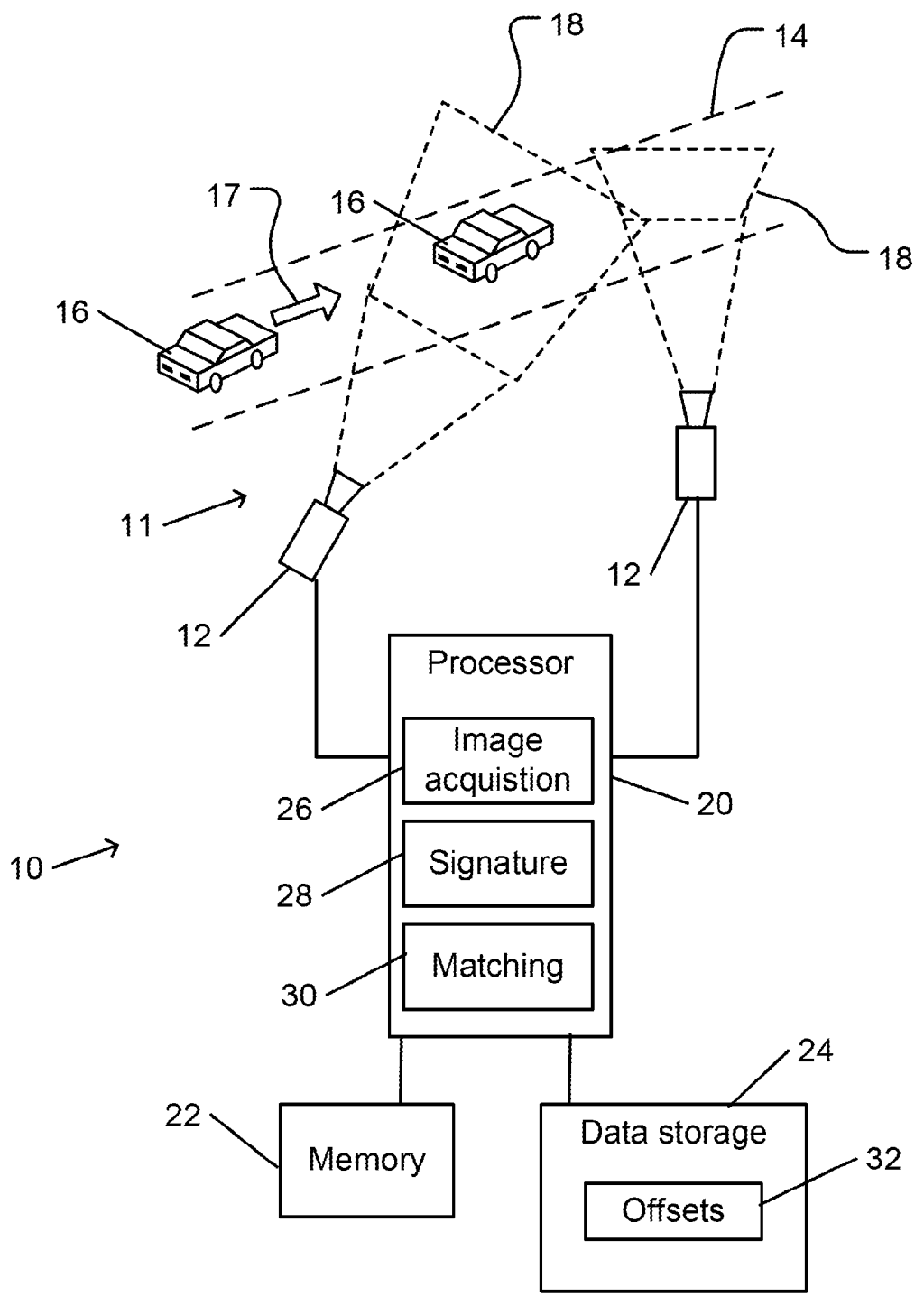
FIG. 1 is a schematic illustration of a system for automatic time signature-based video matching for a camera network, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to an operation or process of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, us of the conjunction "or" as used herein is to be understood as inclusive (any or all of the stated options).

In accordance with an embodiment of the present invention, automatic video matching may include automatic determination of a temporal relationship among cameras of a camera network. The cameras of the network each acquire video streams of a path (e.g., a lane of a road) along which objects (e.g., vehicles, pedestrians, bicycles, skaters, animals in a herd, flock, or school, or other objects) typically move in a substantially coordinated manner (e.g., with a common trajectory with a common, substantially uniform, speed). Each of the cameras acquires a video stream with images of a part or section of the path that is within the field of view of that camera. The fields of view of different cameras of the network cover different segments of the path. The path segments covered by two different cameras may include an overlapping section, or may be separated from one another by a gap. The acquired video stream includes a sequence of images in the form of video frames that are acquired with a predetermined frequency.

Video matching may be applied to any two cameras of the camera network. Application of video matching enables determining whether a moving object that is imaged in the video stream from one camera of the network is identical with an object that is imaged in a video stream from another camera of the network. For example, video matching may include calculating a temporal relationship or offset between two cameras. The temporal relationship may be applied to determine or identify when a moving object that is imaged at a predetermined point within the field of view by one camera is expected to appear at a predetermined point within a video stream that is acquired by another camera of the network. Thus application of the temporal offset may enable identifying or determining if an object that is imaged in a video stream that is acquired by one camera is identical to an object that is imaged by another camera of the network. As another example, video matching may include a spatial relationship between the fields of view between two cameras. The spatial relationship may indicate that the fields of view overlap, or may determine a distance between the two fields of view. The distance may be defined from a point or part (e.g., center or edge) of one of the fields of view to a corresponding point or part of the other field of view.

Images of the path in the form of video input are acquired concurrently by two or more cameras of the network. For example, a path may refer to a lane of a road, or to another type of path where movement along which is substantially constrained to a single trajectory and with a common speed. Video streams that are acquired or captured by different cameras of the network may be synchronized or unsynchronized (e.g., subject to infrequent and limited occurrences of de-synchronization).

A degree of constraint of the motion to a substantially single trajectory or speed may be dependent on characteristics of the camera network or of the video matching process. For example, when fields of view of the cameras overlap or abut, a variety of trajectories may be tolerated (e.g., whenever an object that is imaged as exiting in the field of view of one camera may be identified with an object that is imaged as entering the field of view of another camera). Similarly, lengthening the time over which a time signature is calculated may enable toleration of larger changes in speed of the imaged objects.

In the images acquired by each of the cameras, a part or region of the image is identified that corresponds to a region that lies along the path. The part (e.g., a center, corner, edge, or internal point of the part) may be located at a point in the image. As used herein, reference to the point in the image refers to the part of the image (e.g., point-like or having a finite extent or area) that is located at the point. For example, a human operator may identify in the images from each camera an imaged point that lies along the path. Alternatively or in addition, a point may be identified automatically by a processing unit that is configured to analyze the acquired images. As another example, one or more points may be selected randomly, being randomly distributed on the image. Once a point has been identified, there may be no further need to repeat the process of identifying the point unless relative movement occurs between the camera and the road. Thus, the point may be identified at a time when a camera network system is being set up or initialized, or during maintenance or upgrading of the system.

A video stream that is acquired by each camera of the camera network is analyzed to obtain a signature of the objects that pass the identified point of each camera image. Calculating the signature may include distinguishing imaged objects from the imaged background. For example, a threshold may be applied to one or more characteristics of the image to distinguish an object from a relatively uniform background. Examples of such characteristics may include contrast (e.g., edge detection), brightness (e.g., where the background may be considered to be uniformly dark or bright), color (e.g., hue or saturation to distinguish from a background of uniform color), or other characteristics. A sequence of two or more successive images that are acquired by a single camera may be compared to detect an object in motion.

In a binary scheme, when the objects distinguished from the background, the signature may simply indicate as a function of time whether or not an object is present at the identified point. For example, when analysis of an image that is acquired at a particular time reveals no object at the identified point (e.g., the point represents the background) the value of the function for that time may be set to zero. When analysis of the image reveals that an object is present at the identified point, the value of the function for the time of acquisition of the image may be set to one.

Alternatively or in addition, another, e.g., non-binary, scheme may be used. For example, a range of values may be utilized to indicate different types of objects, different object characteristics, or different backgrounds or background characteristics.

For example, a non-binary signature may be based on detecting or distinguishing additional features of the object images. Such additional features may include one or more of intensity, color, edge forms, vehicle type or model. The signature may be based on full or partial presence of the object image in a predetermined area of the image frame, rather than at a point. A signature may be based on movement in a particular direction (e.g., corresponding to path) rather than presence at a point (e.g., thus excluding from the signature an image of a vehicle that is changing lanes, or an object that is otherwise not moving along a path).

Since each camera of the network is aimed at a different segment of the path, a single object that is moving along the path is expected to pass the identified points of the different cameras at different times. Thus, the signature that is obtained for one camera may be offset from the signature that is obtained for another of the cameras.

Video matching may be applied to coordinate between video streams that are acquired by different cameras of the camera network. A temporal offset that may be applied to coordinate between the two images may be calculated. The temporal offset may be found by adjusting a phase of one of the signatures relative to the other so as to maximize a correspondence between the two signatures. For example, the phase may be adjusted until both of the signatures substantially coincide.

In some cases, e.g., where an identified point has been identified as common to two cameras (e.g., with overlapping fields of view), a phase shift between the signatures of the two cameras may indicate an amount or degree of de-synchronization of the video streams that are acquired by the two cameras. In such a case, the calculated temporal offset may be applied to calculate or compute the amount of de-synchronization.

The temporal offset may be converted to a relative spatial position between fields of views of the cameras. For example, spatial relationships among content of the images (e.g., distances between stationary background objects along the path, such as road markings) may be known. The knowledge of the spatial relationships may enable conversion of an apparent speed of an imaged object relative to the background of the image to an absolute speed (e.g., in standard units such as meters or feet per second, or kilometers or miles per hour). Thus, a time difference between when an object is imaged by one of the cameras (or appears at a particular fixed point within video images acquired by that camera) and when the same object is imaged by the another camera may be converted into a distance between the fields of view of the two cameras (or between the two fixed points within the video images that are acquired by the two cameras).

In some cases, a comparison of the signatures may be utilized to modify or optimize the locations of the points in the image that were used to calculate the signatures. For example, a location of the point in one or both of the video streams may be varied until the correspondence between the signatures is maximized. For example, an initially selected point in one of the video streams is located on an image of one traffic lane, and an initially selected point in the other video stream may be located on another traffic lane. Such a search for a different point may result in selection of points in both video streams that are located in a single traffic lane and at the identical position along the lane (if the fields of view overlap). Image analysis of the video streams may guide or assist the search by determining a general direction of movement of the object images in each video stream.

The calculated temporal offset or relative spatial position may be useful in fully exploiting a camera network. For example, knowing a relative temporal offset or relative spatial position may enable accurate tracking of the movement of a particular object across cameras of the camera network. When an object (e.g., a moving vehicle) that was identified in images acquired by one camera is expected to appear in images acquired by different cameras of the network may be accurately predicted. The capability to accurately predict appearance of the object may increase the likelihood of continued tracking of the object when the object exits the field of view of one of the cameras and enters the field of view of the other.

When the temporal offset (required phase adjustment for coincidence) is less than the time for the image of the object to traverse the entire acquired image of one of the cameras (e.g., from a lower boundary to an upper boundary), overlap between the fields of view of the two cameras may be indicated a single portion of the path is imaged by both of the cameras).

If the temporal offset is greater than the time for the image of the object to traverse the entire acquired image, the phase offset may be indicative of a gap between the fields of view (e.g., no portion of the path is imaged by both of the cameras) or that the identified points are located outside a portion of he path that is imaged by both cameras. In this case, the offset may be analyzed to yield a distance between the fields of view. For example, a measured speed of an imaged object (e.g., determined by analysis of motion of the imaged object within images that are acquired by one of the cameras) may be utilized in measuring the distance. As another example, known orientations of the cameras, together with known geographic positions of the cameras or a known spatial relationship between the cameras, may be utilized to determine a gap between the imaged sections of the path.

Thus, the difficult task of coordination among fields of view of the cameras of the camera network (e.g. determining where exactly the fields of view overlap or the distance between the fields of view) may be performed automatically. Combination of determination of temporal offset or relative spatial position with standard calibration methods may fully automate calibration of large-scale surveillance systems within a global or regional reference frame.

Since calculation and determination of the temporal offset or relative spatial position is automatic, the determination may be repeated as needed. For example, the calculation may be repeated when traffic conditions change, or when there is reason to suspect that one or more cameras of the network may have moved (e.g., its orientation has changed).

FIG. 1 is a schematic illustration of a system for automatic time signature-based video matching for a camera network, in accordance with an embodiment of the present invention.

Camera network system 10 is configured for automatic time signature-based video matching among a plurality of cameras 12 of camera network 11. Each camera 12 is configured to acquire a video stream that images a segment of path 14. For example, path 14 may represent a lane of a road, or another type of path along which objects 16 move single file in a substantially coordinated manner. Objects 16 may represent vehicles or other types of objects that move along path 14 with a coordinated motion 17.

For example, each camera 12 may be configured to acquire a video stream or series of successively acquired still images (to be understood as included in the term "video stream" as used herein). Camera 12 may acquire a video stream in the visible spectral range, or in another spectral range (e.g., thermal or other infrared, microwaver or radar, or another spectral range). Camera 12 may include a binocular pair of cameras that acquire three-dimensional images, a time-of-flight camera, a camera that utilizes structured light patterns to determine depth, or a camera that otherwise acquires depth or three-dimensional images.

Each camera 12 may be characterized by a field of view 18. When operated to monitor path 14, the field of view 18 of each camera 12 may be oriented so as to include part of path 14. One or more objects 16 may pass through field of view 18.

Processor 20 of camera network system 10 may communicate with cameras 12 of camera network 11. Processor 20 may include one or more processing units, e.g. of one or more computers. For example, a processing unit of processor 20 may be located at a control center for camera network system 10. Processor 20 may communicate with cameras 12 via a wired or wireless communications channel or network. Processor 20 may be configured to operate in accordance with programmed instructions stored in memory 22. Processor 20 may be configured to control operation of cameras 12, to process images that are acquired by cameras 12. Processor 20 may be configured to execute an application for automatic time signature-based video matching among cameras 12 of camera network 11.

Processor 20 may communicate with memory 22. Memory 22 may include one or more volatile or nonvolatile memory devices. Memory 22 may be utilized to store, for example, programmed instructions for operation of processor 20, data or parameters for use by processor 20 during operation, or results of operation of processor 20

Processor 20 may communicate with data storage device 24. Data storage device 24 may include one or more fixed or removable nonvolatile data storage devices. For example, data storage device 24 may include a computer readable medium for storing program instructions for operation of processor 20. The programmed instructions may include image acquisition module 26 for acquisition of video streams by cameras 12. The programmed instructions may include signature calculation module 28 for creating time signatures from the video streams that are acquired by each camera 12. The programmed instructions may include video matching module 30 for calculating a temporal offset or spatial relationship for video matching among cameras 12 of camera network 13.

Data storage device 24 may be remote from processor 20. In such cases data storage device 24 may be a storage device of a remote server storing module image acquisition module 26, signature calculation module 28, or video matching module 30 in the form of an installation package or packages that can be downloaded and installed for execution by processor 20.

Data storage device 24 may be utilized to store data or parameters for use by processor 20 during operation, or results of operation of processor 20. In particular, data storage device 24 may be utilized to store offsets 32. For example, offsets 32 may include one or more of temporal offsets or spatial relationships between pairs of cameras 12 (e.g., pairs of adjacent or neighboring cameras 12), or between each camera 12 and each other camera 12 (or a subset of all other cameras 12) of camera network 11.

Processor 20 of camera network system 10 may be operated to execute a method for automatic time signature-based video matching among cameras 12 of camera network 11.

Figure 2A:
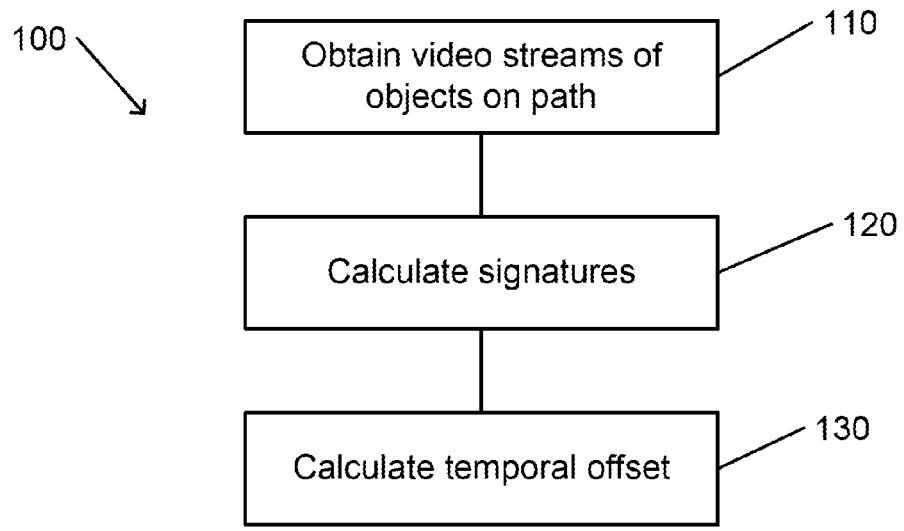
FIG. 2A is a flowchart depicting a method for automatic time signature-based video matching among cameras of a camera network, in accordance with an embodiment of the present invention.

FIG. 2A is a flowchart depicting a method for automatic time signature-based video matching among cameras of a camera network, in accordance with an embodiment of the present invention.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Automatic video matching method 100 may be executed by a processor of a camera network system. Execution of automatic video matching method 100 may be initiated automatically at predetermined times or intervals (e.g., at times when motion of objects on a path, such as a vehicle traffic in a traffic lane, is expected to proceed in a coordinated manner, e.g., at a substantially constant speed, or at another predetermined time or interval). Execution of automatic video matching method 100 may be initiated automatically upon detection of an event (e.g., a sensed or detected change in traffic conditions or detection of a change in orientation of a camera of the camera network). Execution of automatic video matching method 100 may be initiated by an operator of the camera network system.

Automatic video matching method 100 may be applied in parallel or sequentially to more than one path. For example, automatic video matching method 100 may be applied to two or more lanes of a road that is monitored by the camera network.

Video streams are obtained from cameras of the camera network (block 110). The video streams include images of objects (e.g., vehicular traffic) moving along the path (e.g., a traffic lane). For simplicity, automatic video matching method 100 is described as applied to video matching between two cameras. However, automatic video matching method 100 may be applied to any number of cameras (which may be considered in pairs or in groups of more than two cameras).

Figure 3A:
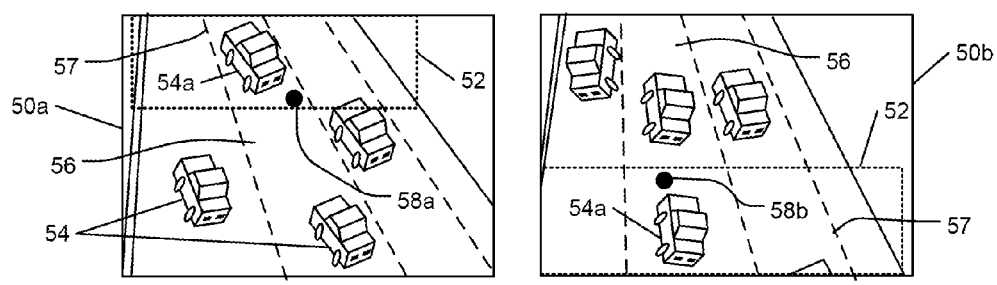
FIG. 3A schematically illustrates concurrent video frames that are acquired by two cameras of a camera network for application of automatic video matching, in accordance with an embodiment of the present invention.

FIG. 3A schematically illustrates concurrent video frames that are acquired by two cameras of a camera network for application of automatic video matching, in accordance with an embodiment of the present invention.

In the example of FIG. 3A, the moving objects are represented by vehicle images 54 in video frames 50a and 50b. Vehicle images 54 represent receding traffic (e.g., are viewed from the rear). Some of vehicle images 54 are shown as moving along a representative path in the form of lane 56. Any of the illustrated lanes may have been utilized in place of lane 56. Although lane 56 is shown as straight, a curved lane or other path may also be used in automatic video matching method 100.

An imaged path, such as lane 56, may be detected automatically. For example, analysis of patterns of motion of object images may yield one or more defined paths or lanes. Alternatively or in addition, one or more image analysis techniques for detecting a known shape or form may be applied to detect markings that delineate a path (e.g., lane separation lines 57). Alternatively or in addition, a human operator may initially (e.g., when setting up or performing maintenance on a camera network system) or occasionally identify, or verify identification of, one or more imaged paths. One or more imaged paths may be detected automatically.

In the example of FIG. 3A, overlap zone 52 is common to both of video frames 50a and 50b. Thus, the region whose image is included in overlap zone 52 is common to the fields of view of the two cameras that acquired video frames 50a and 50b. Since video frames 50a and 50b are represented as having been acquired concurrently, overlap zone 52 includes vehicle image 54a in both video frame 50a and in video frame 50b. In other examples of pairs of video frames, there may be no overlap zone (e.g., the two fields of view cover geographically separate regions) or images may not be acquired concurrently.

Application of automatic video matching method 100 may be most effective between pairs of cameras where a pattern of motion of the objects remains substantially coordinated. Application of automatic video matching method 100 may be less effective where conditions of the path are likely to result in significant changes in patterns of motion. For example, automatic video matching method 100 may be applied to two cameras on a section of a highway, freeway, toll road, or other road where there are no permanent or temporary disruptive features between the cameras. Disruptive features may include intersections, traffic lights or stop signs, merging lanes, on or off ramps, hills, crosswalks, toll booths or plazas, changes in posted speed limits, accident scenes or stalled vehicles, or other features that tend to change a speed of vehicular traffic or induce increase lane changing.

Time signatures may be calculated for a path whose image is included in the video streams (block 120). The time signature is indicative of movement of objects, such as vehicle images 54, past a point in each image of path, such as signature points 58a and 58b on lane 56. In the example shown in FIG. 3A, signature points 58a and 58b are located within overlap zone 52. In other examples or cases, the signature points need not be located within and overlap zone.

Calculation of the time signatures may include distinguishing moving object images, such as vehicle images 54, from a stationary background.

Figure 3B:
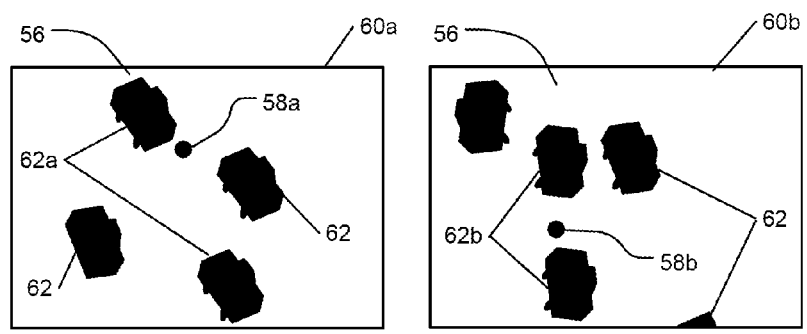
FIG. 3B schematically illustrates distinguishing moving objects from a stationary background in the video frames shown in FIG. 3A.

FIG. 3B schematically illustrates distinguishing moving objects from a stationary background in the video frames shown in FIG. 3A.

For simplicity, a binary separation scheme is applied to video frames 50a and 50b of FIG. 3A to form separation frames 60a and 60b, respectively. For example, background subtraction with application of a threshold may be applied to each of video frames 50a and 50b to form separation frames 60a and 60b. In separation frames 60a and 60b, object images 62 are shown having one value (colored black), while the stationary background is shown as having another value (colored white). Alternatively or in addition, another, non-binary, separation scheme may be applied in which multiple values are created (e.g., representing different types of objects, e.g., objects moving at different speeds).

Object images 62a in separation frame 60a, and object images 62b in separation frame 60b, represent images of those objects (e.g., vehicles) that are moving within the boundaries of the path (e.g., lane 56).

The time signature for either separation frame 60a or separation frame 60b represents the presence or absence of an object image 62a or 62b at signature point 58a or 58b, respectively, at the time of acquisition of corresponding video frames 50a and 50b. A function of time is calculated in which the function has one value (e.g., zero) when no object image 62a or 62b is present at signature point 58a or 58b (the situation that is illustrated in FIG. 3B). The function has another value (e.g., 1 or another nonzero constant value) when an object image 62a or 62b is present at signature point 58a or 58b.

Figure 4A:
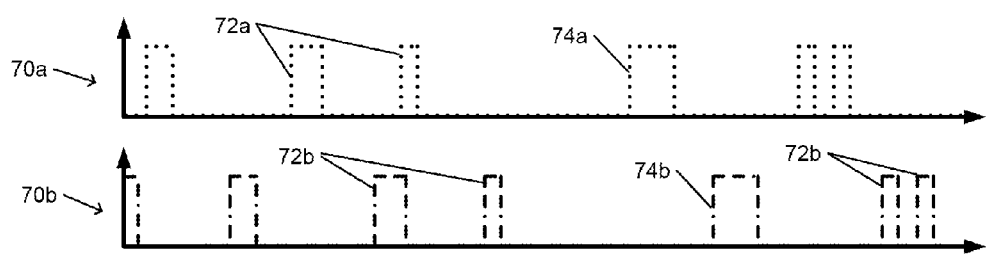
FIG. 4A schematically illustrates concurrent time signatures of two different video streams for automatic video matching, in accordance with an embodiment of the present invention.

FIG. 4A schematically illustrates concurrent time signatures of two different video streams for automatic video matching, in accordance with an embodiment of the present invention.

In camera signatures 70a and 70b, the horizontal axis represents a common time axis. The vertical axis represents the presence (high value) or absence (zero value) of an object image at the signature point for the video stream that is acquired by each of the cameras. For example, peaks 72a and 72b represent the presence of objects at the signature points.

Figure 4B:
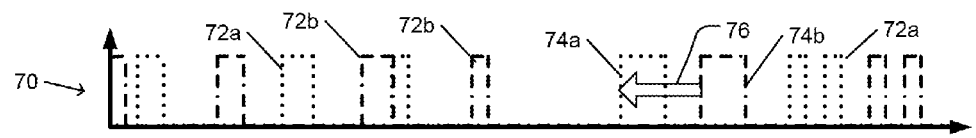
FIG. 4B schematically illustrates the time signatures of FIG. 4A as plotted on a common coordinate system.

FIG. 4B schematically illustrates the time signatures of FIG. 4A as plotted on a common coordinate system.

Examination of combined signature 70 shows misalignment between peaks 72a and 72b.

A temporal offset of the time signature of one of the cameras relative to another of the cameras may be calculated (block 130). The temporal offset may be configured to achieve maximal correspondence between time signatures 70a and 70b, or between corresponding peaks 72a and 72b of combined signature 70. For example, a correlation of time signature 70a and time signature 70b may be calculated as the phase of one of the time signatures is shifted relative to the other time signature. The temporal offset may be taken as the value of the phase shift that yields maximum correlation.

Other measures of correspondence may be used. For example, dynamic time warping may be applied to determine a correspondence between time signatures at different time scales, e.g., due to unsynchronized video streams.

In the example of FIG. 4B, it may be noted that application of temporal offset 76 to peak 74b causes peak 74b of time signature 70b to coincide with peak 74a of time signature 70a.

Figure 4C:
FIG. 4C schematically illustrates the time signatures of FIG. 4B after application of a temporal offset.

FIG. 4C schematically illustrates the time signatures of FIG. 4B after application of a temporal offset.

In aligned signature 80, time signature 70b has been shifted by the amount of temporal offset 76 to coincide with time signature 70a. Thus, for example, peak 74 corresponds with peak 74b of time signature 70b shifted by temporal offset 76 to coincide with peak 74a of time signature 70a. Similarly, peaks 72 correspond with peaks 72b of time signature 70b shifted by temporal offset 76 to coincide with corresponding peaks 72a of time signature 70a.

In the example of FIGS. 4A-4C, the objects corresponding to peaks 72a and 72b are all moving with a constant speed. Thus, in both of time signatures 70a and 70b, the shapes of, and spacing between, corresponding peaks 72a and 72b are identical. Therefore, in aligned signature 80, peaks 72 and 74 are identical to their corresponding component peaks 72a and 72b.

In general, movement of individual objects (e.g., vehicles) along a path (e.g., traffic lane) may not be expected to be perfectly coordinated. For example, at a given time, one vehicle may move faster or slower than other vehicles in the lane (e.g., may be overtaking another vehicle, or another vehicle may be overtaking it). However, motion of objects along the path may be characterized by an average speed (e.g., except under conditions of heavy traffic or an obstruction). Therefore, temporal offset 76 may be calculated over a sufficiently long time period to achieve maximal correspondence (e.g., maximum correlation) between time signatures 70a and 70b.

In some cases, a spatial relationship between the fields of view of two cameras of the camera network may be calculated on the bases of the calculated temporal offset 76 for the time signatures 70a and 70b of those two cameras.

Figure 2B:
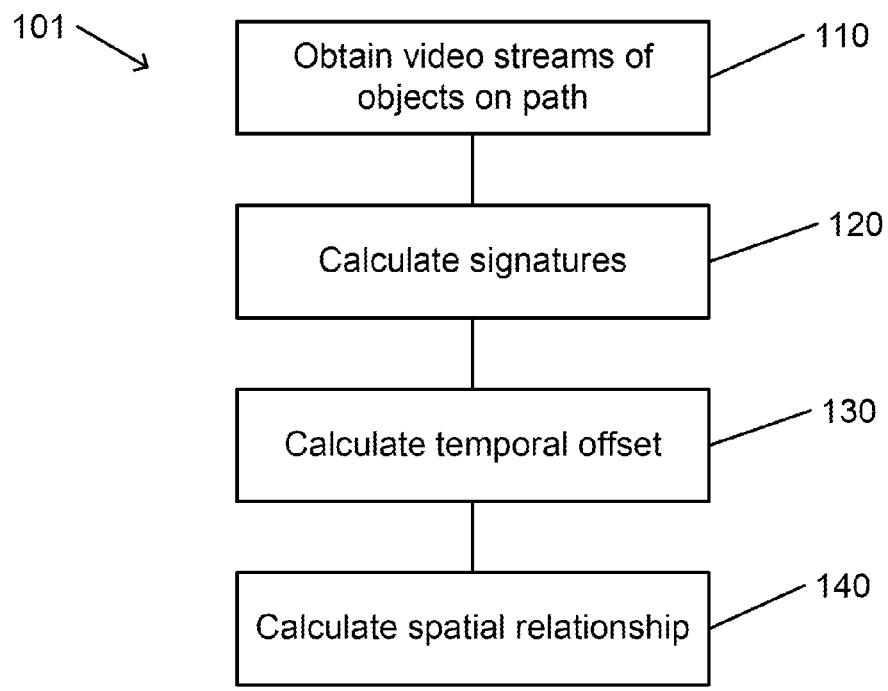
FIG. 2B is a flowchart depicting a variant of the method depicted in FIG. 2A that includes calculation of a spatial relationship.

FIG. 2B is a flowchart depicting a variant of the method depicted in FIG. 2A that includes calculation of a spatial relationship.

A calculation of a temporal offset (block 130) may be used to calculate a spatial relationship among fields of view of the cameras (block 140). For example, a calibration of one or the cameras may enable calculation of a distance of movement of an object during acquisition of a video stream. A speed of the object along the path may be calculated on the basis of the calculated distance. Thus, the speed and temporal offset may be used to calculate a distance between the points in the fields of view of the cameras that correspond to identified signature points (e.g., signature points 58a and 58b of FIG. 3A) in video frames (e.g., video frames 50a and 50b) that were acquired by those cameras.

The distance may be utilized to calculate a degree of overlap between the fields of view of the two cameras, or a size of a gap between the two fields of view. For example, the gap may be described in terms of a length (e.g., in meters or another length unit), or a length and a direction or relative orientation.

Alternatively or in addition, additional image analysis techniques may be applied to determine a degree of overlap or size of a gap. For example, geographical information regarding features of the path (e.g., lane or road markings) or its surroundings, or of one or more cameras, may be utilized in determining relative or absolute locations of fields of view of cameras of the camera network.

In calculating a temporal offset or spatial relationship, some calculated values may be considered to be more reliable or significant (e.g., may be assigned a greater weighting factor) than others. For example, a value calculated during light traffic conditions (e.g., where vehicle traffic proceeds unimpeded and as single vehicles) may be considered to be more reliable than a value calculated under heavy traffic conditions (e.g., where traffic that is near to bumper-to-bumper may interfere with detection of individual vehicles).

When an object that is moving along the path is tracked by a camera of the network, an image of the object is detected as moving in a video stream that is acquired by that camera. The temporal offset or spatial relationship may be applied to determine if an object image that appears in a video stream that is acquired by another camera of the camera network corresponds to the same object that was tracked by the first camera. When it is determined that the fields of view of the two cameras overlap one another, tracking of the object may be handed over from one of the cameras to the other when the object image appears in corresponding points of in video frames that were acquired concurrently by each of the cameras. When there is no overlap, the handover may take place when an image of the object appears (e.g., at a predetermined point) in a video frame that is acquired by a second camera after a predetermined time delay after the image of the object appears (e.g., at a corresponding point) in a video frame that was acquired by a first camera. The time delay may be determined in accordance with the calculated temporal offset or delay between fields of view, as well as a measured speed of motion of the object.

Under some circumstances, execution of automatic video matching method 100 may not yield a useful result. In some cases, vehicle traffic may be detected as not proceeding in a coordinated manner. For examples, the presence of an accident or stalled vehicle may result in increased lane changing by vehicles such that their travel does not conform to a single path. Heavy traffic may result in stop-and-go motion by vehicles within a lane such that the form of a time signature for one camera may have a shape that does not correspond to the shape of a time signature for another camera. Thus, maximizing the correspondence may lead to a misleading temporal offset. Such contraindicative conditions may be detected by analysis of video streams that are acquired by one or more of the cameras. For example, motion of one or more vehicle images across a lane separator may be considered to be contraindicative of execution of automatic video matching method 100. Detection of a change in speed (e.g., acceleration or deceleration) of a vehicle image during the course of a video stream may be considered to be contraindicative of execution of automatic video matching method 100. In such cases, the video matching method may limit analysis (e.g., calculation of time signatures or temporal offsets) to a subset of the imaged vehicles. Distances between peaks of the time signatures may be ignored when calculating the temporal offset.

Application of automatic time signature-based video matching for a camera network in accordance with an embodiment of the present invention may be advantageous. For example, a calculation base on time signatures may be more robust that approaches based on application of standard image registration methods or on calculation of trajectories. No additional hardware or other physical modifications to the camera may be required.

The invention claimed is:

1. A method for automatically matching video streams from two cameras of a camera network, the method comprising:

obtaining a video stream each video stream including images of a plurality of moving objects;

calculating a time signature for each of the video streams, each time signature being indicative of a time at which an image of one of said plurality of moving objects is located at a predetermined part of the frame;

calculating a temporal offset of one of the signatures relative to the other signature that, when applied to said one of the signatures, substantially maximizes a correspondence between said one of the signatures and the other signature, the temporal offset being applicable to video streams that are acquired by the two cameras to determine if a moving object that is imaged by one of the cameras is identical to a moving object that is imaged by the other of the cameras, and using the temporal offset to calculate a spatial relationship between fields of view of the two cameras, wherein calculating the spatial relationship comprises calculating a gap between the fields of view.

2. The method of claim 1, wherein said plurality of moving objects moves along a substantially common path.

3. The method of claim 2, wherein the predetermined part is located on an image of the path.

4. The method of claim 2, wherein the path comprises a traffic lane.

5. The method of claim 2, wherein said plurality of moving objects moves along the path with a substantially constant speed.

6. The method of claim 1, further comprising changing a location of the predetermined part of the frame in accordance with a comparison of the time signatures.

7. The method of claim 1, wherein the predetermined part is defined by a point.

8. The method of claim 1, wherein calculating the time signature comprises applying a binary scheme.

9. The method of claim 1, wherein the correspondence is maximized when a correlation of the two signatures is maximized.

10. The method of claim 1, wherein calculating the temporal offset comprises applying dynamic time warping to the signatures.

11. The method of claim 1, wherein
    calculating the spatial relationship comprises calculating a degree of overlap between the fields of view.

12. The method of claim 1, further comprising using the calculated temporal offset to calculate a de-synchronization of the video streams.

13. The method of claim 1, wherein a portion of an image, which is located at a point in the image and which corresponds to a region that lies along a path, is identified thereby to define a point-identifying process and an identified point, and for at least one point, the point-identifying process is performed once during system down-time and is not repeated unless relative movement occurs between camera and road, and wherein a video stream acquired by each camera of the camera network is analyzed to obtain a signature of objects that pass the identified point of each camera image and wherein calculating the signature includes distinguishing imaged objects from imaged background, and wherein movement along the path is substantially constrained to a single trajectory and a common speed.

14. The method of claim 1, wherein a comparison of the signatures is utilized to optimize locations of points, in the image, used to calculate signatures and wherein a location of a point used to calculate signatures in at least one video stream is varied until a point is found for which correspondence between the signatures is maximized.

15. A non-transitory computer readable storage medium having stored thereon instructions that when executed by a processor will cause the processor to perform the method of:
- obtaining a video stream that is acquired by each camera of a camera network of a plurality of moving objects;
- calculating a time signature for each video stream, the time signature being indicative of a time at which an image of one of said plurality of moving objects is located at a predetermined part of a frame of that video stream; and
- calculating a temporal offset between two of the time signatures, such that when the temporal offset is applied to one of the two time signatures, a correspondence between the two time signatures is maximized;
- applying the temporal offset to video streams that are acquired by the cameras that acquired the video streams from which said two of the time signatures were calculated to determine if a moving object that is imaged by one of the cameras is identical to a moving object that is imaged by the other of the cameras, and
- using the temporal offset to calculate a spatial relationship between fields of view of the two cameras,
- wherein calculating the spatial relationship comprises calculating a gap between the fields of view.

16. The computer readable storage medium of claim 15, wherein the instructions are further executable by the processor to identify within each video stream an image of a path along which said plurality of moving objects moves.

17. The computer readable storage medium of claim 15, wherein the instructions are further executable by the processor to cause the processor to perform the method of calculating a spatial relationship between fields of view of the cameras.

18. A system comprising:
- a network of a plurality of cameras, each camera being configured to acquire a video stream of a plurality of moving objects; and
- a processing unit in communication with a computer readable medium, wherein the computer readable medium contains a set of instructions wherein the processing unit is designed to carry out the set of instructions to:
- calculate a time signature for each video stream that is acquired by each of said plurality of cameras, each time signature being indicative of a time at which an image of one of said plurality of moving objects in that video stream is located at a predetermined part of a frame of that video stream;
- calculate a temporal offset each of the time signatures relative to another of the time signatures such that when the time offset is applied to said each of the time signatures, a correspondence between said each of the time signatures and said another of the time signatures is maximized; and
- apply the temporal offset to video streams that are acquired by different cameras of said plurality of cameras to determine if a moving object that is imaged by one of said plurality of cameras is identical to a moving object that is imaged by another of said plurality of cameras,
- wherein the system is configured to use the temporal offset to calculate a spatial relationship between fields of view of the two cameras, said calculating including calculating a gap between the fields of view.

19. The system of claim 18, wherein said plurality of moving objects moves along a substantially common path.

20. The system of claim 18, wherein said plurality of moving objects comprises a plurality of vehicles.

* * * * *